Oct. 27, 1953

V. S. DANIELSON ET AL 2,656,935

SHOCK ABSORBING MECHANISM FOR DRAFT
RIGGINGS OF RAILWAY CARS

Filed July 31, 1951

3 Sheets-Sheet 1

Inventors:
Vernon S. Danielson.
Carl A. Anderson.
By Henry Fuchs
Atty.

Oct. 27, 1953
V. S. DANIELSON ET AL
2,656,935
SHOCK ABSORBING MECHANISM FOR DRAFT
RIGGINGS OF RAILWAY CARS
Filed July 31, 1951
3 Sheets-Sheet 2
Fig. 3
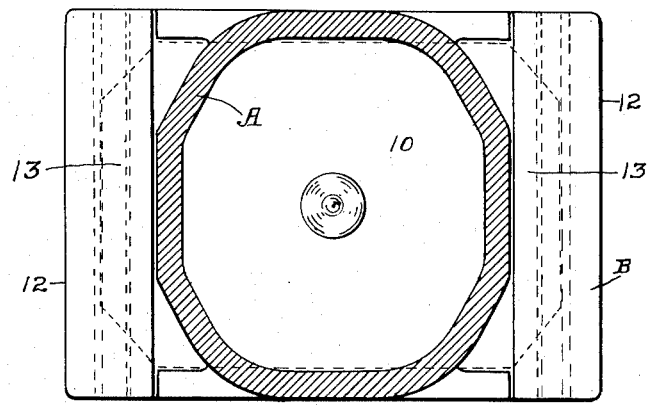
Fig. 4
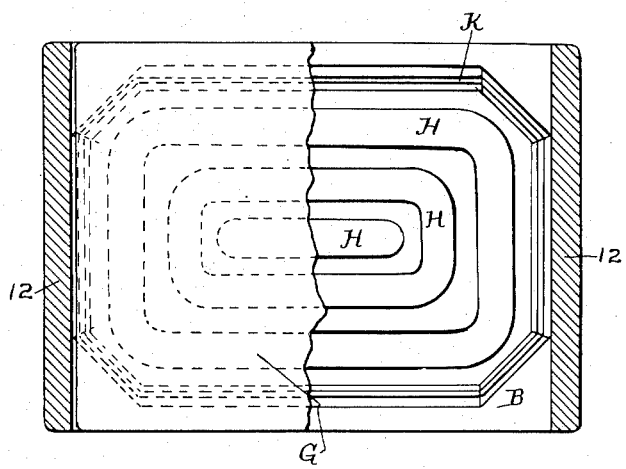
Fig. 5
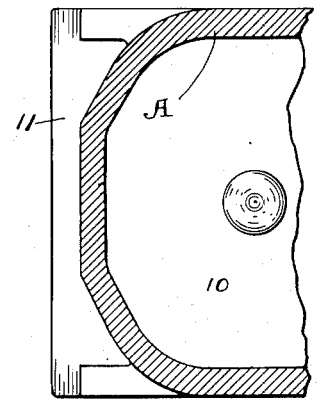
Fig. 6
Inventors:
Vernon S. Danielson,
Carl A. Anderson.
By Henry Fuchs
Atty.

Oct. 27, 1953          V. S. DANIELSON ET AL          2,656,935
           SHOCK ABSORBING MECHANISM FOR DRAFT
                  RIGGINGS OF RAILWAY CARS
Filed July 31, 1951                          3 Sheets-Sheet 3
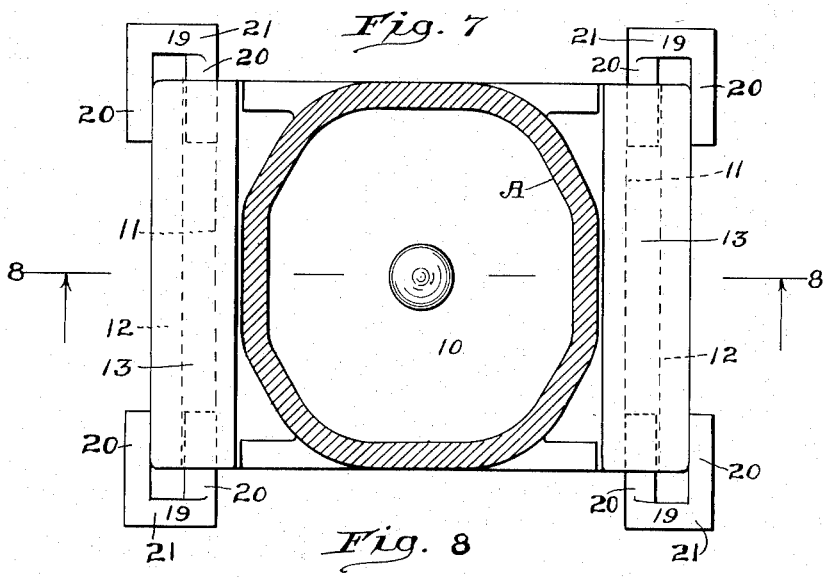
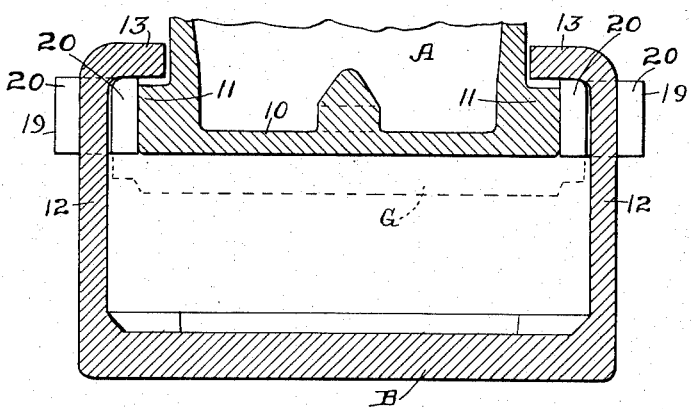
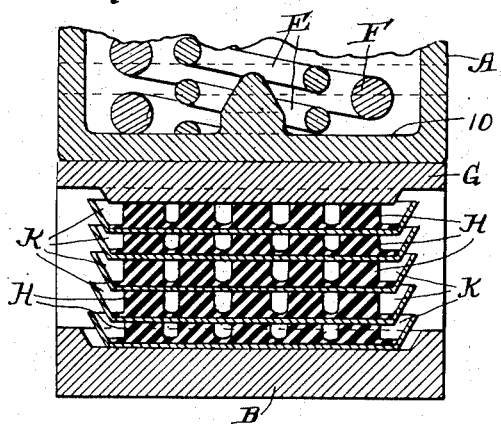
Inventors:
Vernon S. Danielson
Carl A. Anderson.
By Henry Fuchs
Atty.

Patented Oct. 27, 1953

2,656,935

UNITED STATES PATENT OFFICE 2,656,935

SHOCK ABSORBING MECHANISM FOR DRAFT RIGGINGS OF RAILWAY CARS

Vernon S. Danielson, Dolton, and Carl A. Anderson, Chicago, Ill., assignors to W. H. Miner, Inc., Chicago, Ill., a corporation of Delaware Application July 31, 1951, Serial No. 239,521

5 Claims. (Cl. 213—32)

One object of the invention is to provide a shock absorbing mechanism comprising a friction casing, a friction clutch slidingly engaged within the casing and arranged to receive the actuating force, a rear follower member movable lengthwise of the mechanism with respect to the casing, cooperating stop means on said casing and follower for limiting outward movement of the follower with respect to the casing, and a rubber cushioning unit interposed between the casing and the follower, the rubber unit being under initial compression between the casing and the follower member, wherein the parts are designed so that the rear follower and casing, with the rubber unit carried by the follower and under initial compression, may be readily assembled.

A more specific object of the invention is to provide a mechanism as set forth in the preceding paragraph, wherein the casing is provided with transverse stop shoulders and the rear follower is provided with forwardly extending arms, having inturned flanges at their outer ends engageable with the stop shoulders of the casing to limit outward movement of the follower, and wherein a follower plate bearing on the rubber unit and removable spacing members between the follower plate and the inturned flanges of the rear follower employed to temporarily hold the rubber unit under predetermined compression against the rear follower, thus providing sufficient clearance between the flanges of the rear follower and the follower plate to permit easy engagement of the flanges of the rear follower in back of the stop shoulders of the casing in assembling the rear follower with said casing.

Other objects of the invention will more clearly appear from the description and claims hereinafter following.

Figure 1:
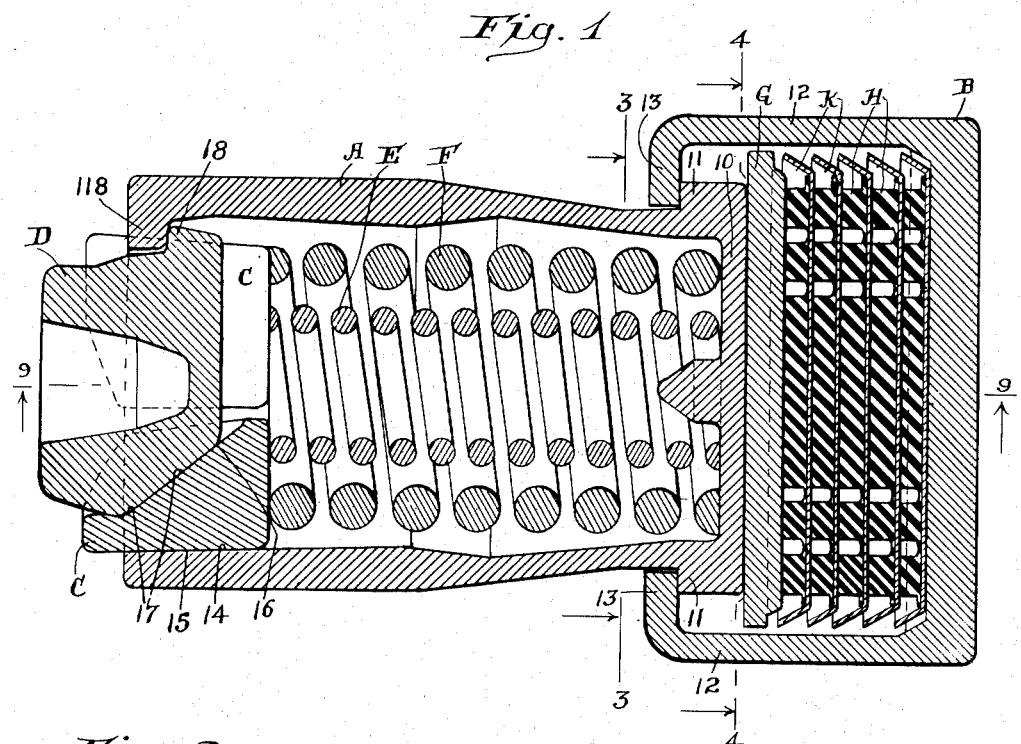
Figure 2:
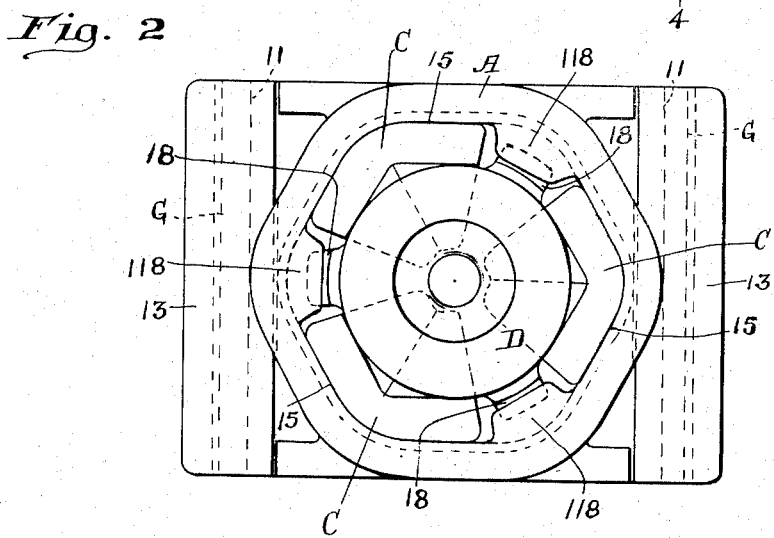

In the accompanying drawings forming a part of this specification, Figure 1 is a horizontal, longitudinal sectional view of our improved combined friction and rubber shock absorbing mechanism. Figure 2 is a front elevational view of Figure 1, that is, looking from left to right in Figure 1. Figure 3 is a transverse, vertical sectional view, corresponding substantially to the line 3—3 of Figure 1, the springs of the friction shock absorber being omitted. Figure 4 is a transverse, vertical sectional view, corresponding substantially to the line 4—4 of Figure 1, with the follower plate partly broken away, and showing the rubber shock absorbing unit in elevation at said broken away portion of the follower plate. Figure 5 is a view similar to Figure 3, broken away, and with the rear follower omitted. Figure 6 is a detail perspective view of one of the temporary spacing members employed in assembling the rear follower with the friction casing. Figure 7 is a view similar to Figure 3, with the temporary spacing members in position. Figure 8 is a horizontal sectional view, corresponding substantially to the line 8—8 of Figure 7, partly broken away, with the rubber unit omitted and the follower plate illustrated in dotted lines. Figure 9 is a longitudinal, vertical sectional view, partly broken away, corresponding substantially to the line 9—9 of Figure 1.

Our improved combined friction and rubber shock absorbing mechanism comprises broadly a friction casing A, a rear follower member B, a set of three friction shoes C—C—C slidable within the casing, a wedge block D in wedging engagement with the shoes, coil springs E and F, a follower plate G bearing on the rear of the casing, a series of rubber mats or pads H—H, and a series of spacing members K—K, the latter being alternated with the mats H.

The friction casing A is in the form of a hollow, tubular member of hexagonal, transverse cross section. The casing A is closed at its rear end by a transverse wall 10, which projects beyond the sides of the casing, as shown most clearly in Figures 1, 2, 3, and 5. The projecting opposite side portions of the wall 10 are forwardly thickened at their extremities throughout their height, thus providing rear stop shoulders 11—11, which are continuous from top to bottom of said projecting portions of the wall 10.

The rear follower B is in the form of a relatively thick plate, having forwardly projecting side arms 12—12 extending a short distance forwardly beyond the rear end of the casing A and provided with inturned flanges 13—13 at their front ends engaged in front of the stop shoulders 11—11 of the casing A. As shown most clearly in Figures 1 and 8, sufficient clearance is provided between the outer edges of the projecting portions of the wall 10 and the inner sides of the arms 12—12 of the rear follower member B, to accommodate removable spacing members or keys employed in assembling the rear follower member with the casing A.

The friction shoes C, which are three in number, are telescoped within the casing A and are provided with longitudinally extending V-shaped friction surfaces 14 in sliding engagement with longitudinally extending V-shaped, interior friction surfaces 15, provided in the casing. Each shoe C has a V-shaped wedge face 16 on its inner side.

The wedge D is in the form of a block having three V-shaped wedge faces 17 at its inner end, arranged symmetrically about the central, longitudinal axis of the casing A and engaging, respectively, the wedge faces 16 of the shoes C. The wedge block D is further provided with three radially outwardly extending stop lugs 18, which extend between adjacent shoes and engage in back of three inturned stop lugs 118 on the casing A, to limit outward movement of the wedge block D and thus hold the parts of the friction shock absorbing mechanism assembled.

The springs E and F are disposed within the casing A, each spring being in the form of a helical coil having its opposite ends bearing on the inner ends of the shoes C and the end wall 10 of the casing A, respectively.

The follower plate G, which is of substantially rectangular outline, is disposed between the arms 12—12 of the rear follower B and bears on the rear end of the casing A, that is, on the wall 10 of said casing.

The rubber mats or pads H and the spacing members K, which together form a cushioning unit, are disposed between the rear follower B and the follower plate G, and are embraced by the arms 12—12 of said follower B, the spacing members K being alternated with the mats or pads H. The spacing members K are preferably in the form of pan-shaped elements within which the mats or pads are fixed by being vulcanized thereto. In the completely assembled condition of the mechanism, the rubber cushioning unit, comprising the mats H and the spacing members K is held under a predetermined amount of initial compression between the rear follower member B and the follower plate G.

In assembling the mechanism, the rear follower member B with the rubber cushioning unit and follower plate G in place therein are applied as a unit to the casing A. In preparing the parts for assembling, the cushioning unit comprising the pads H and the spacing members K, and the follower plate G are first placed within the follower B, between the arms 12—12 of said follower, by inserting the same endwise between said arms. The rubber cushioning unit is then compressed by forcing the follower plate G toward the rear follower member B and clamping the same in compressed condition by any suitable means, such as spacing members, inserted between the flanges 13 of the arms 12 and the forward side of the follower plate G. In the present case, four such spacing members, indicated by 19—19—19—19, are employed. As shown in Figures 6, 7, and 8, each spacing member 19 is in the form of a U-shaped key, having laterally spaced, barlike fingers 20—20 connected by a transverse end section 21. As shown in Figures 7 and 8, the spacing keys 19 are engaged over the top and bottom portions of the arms 12 with one of the fingers of each U-shaped key on the outer side of the arm, and the other on the inner side of the same, interposed between the inner side of the flange 13 of said arm and the outer side of the follower plate G. After the four keys 19—19—19—19 have been thus placed in position, the pressure is removed from the follower plate G, the keys thus serving to clamp the parts in position until the follower member B has been assembled with the casing A. As shown in Figure 8, the inner finger 20 of each U-shaped key is proportioned so that it is freely accommodated in the space between the protruding enlarged portion of the end wall 10 at the corresponding side of the mechanism and the arm 12 and holds the follower plate G spaced inwardly from the inner side of the corresponding flange 13 a distance greater than the overall thickness of the corresponding thickened portion of the end wall 10 of the casing A. With the follower plate G thus clamped in position, the rear follower member B is engaged with the casing A by first disposing the same alongside the casing A, positioned so that the flanges 13—13 thereof will clear the front sides of the thickened sections 11—11 of the wall 10, when the follower member B is displaced laterally inwardly with respect to the casing. With the follower member B thus positioned, the same is moved laterally with respect to the casing A to dispose the flanges 13—13 in front of the shoulders 11—11 of the casing. After this has been done, the keys 19—19—19—19 are removed, permitting the follower plate G to be projected against the rear wall of the casing A by the expansive action of the compressed rubber cushioning unit. In the completely assembled condition of the mechanism, the rubber cushioning unit is maintained under a certain amount of predetermined initial compression or load, thus holding the follower plate G against the wall 10 of the casing A under pressure.

The operation of our improved shock absorbing mechanism is as follows: During relative movement of the front follower of the usual draft rigging and the casing A toward each other, the wedge D is forced inwardly of the casing A, thereby wedging the shoes C—C—C apart and sliding the same inwardly on the friction surfaces of the casing against the resistance of the springs E and F. During this action, pressure is transmitted to the rubber unit comprising the mats H and the spacing members K, through the casing A, thereby also effecting compression of the rubber unit. Compression of the mechanism is limited when the front follower comes into engagement with the front end of the casing A.

We claim:

1. In a combined rubber and friction draft gear, the combination with a friction casing having stop shoulders at opposite sides of the rear end thereof; of friction shoes slidingly telescoped within the casing; spring means within the casing yieldingly opposing inward movement of said shoes; a wedge block in wedging engagement with the shoes; a rear follower having forwardly projecting side arms provided with inturned flanges in shouldered engagement with the stop shoulders of the casing, said arms rearwardly of said flanges being spaced laterally from said casing; a follower plate bearing on the rear end of the casing, said follower plate extending outwardly beyond said casing at opposite sides of the latter; and a rubber cushioning unit interposed between and bearing on said follower plate and the rear follower, said rubber cushioning unit being under initial compression.

2. In a combined rubber and friction draft gear, the combination with a friction casing having stop shoulders at opposite sides of the rear end thereof; of friction shoes slidingly telescoped within the casing; spring means within the casing yieldingly opposing inward movement of said shoes; a wedge block in wedging engagement with the shoes; a rear follower having forwardly projecting side arms provided with inturned flanges in shouldered engagement with the stop shoulders of the casing, said arms rearwardly of said flanges being spaced laterally from said casing; a follower plate bearing on the rear end of the casing, said follower plate extending outwardly beyond said casing at opposite sides of the latter; and a rubber cushioning unit interposed between and bearing on said follower plate and the rear follower, said rubber cushioning unit being under initial compression, said unit comprising a series of spacing members and a series of rubber pads, said spacing members being alternated with said pads.

3. In a combined rubber and friction draft gear, the combination with a friction casing; of a friction clutch slidingly telescoped within the front end of said casing; springs within the casing bearing on said clutch; a transverse wall closing the rear end of said casing, said wall extending outwardly beyond said casing at opposite sides of the latter; vertically extending, transverse stop shoulders at opposite sides of the casing on said outwardly extending portions of said rear wall; a rear follower having forwardly projecting arms at opposite sides thereof, said arms having inturned flanges at their outer ends extending in front of said stop shoulders in overhanging relation to the same, the portions of said arms at said inturned flanges being laterally outwardly spaced from the lateral extremities of the rear wall of the casing; a follower plate bearing on the outer side of said rear wall of the casing, said follower plate projecting laterally outwardly beyond the end limits of said rear wall of the casing; and a rubber cushioning unit interposed between said follower plate and rear follower, said unit including a series of rubber pads and a series of spacing plates alternated with said pads, said rubber unit being under initial compression.

4. In a mechanism of the character described, the combination with a casing closed at one end and having vertically extending, transverse stop shoulders on opposite sides thereof at said closed end, said shoulders being spaced a predetermined distance from the rear end of the casing; of a follower having forwardly extending side arms provided with inturned flanges at their front ends engageable in front of said stop shoulders; a rubber cushioning unit between said arms and abutting said follower; a follower plate bearing on the front end of said cushioning unit; removable spacing members interposed between said flanges and the forward side of said follower plate, the thickness of said spacing members considered in direction lengthwise of the mechanism being in excess of the distance measured from the rear end of the casing to said stop shoulders, thereby providing sufficient clearance between the flanges of the arms and the follower plate to permit easy engagement of the follower with the casing, by vertical displacement of the follower with respect to the casing, with the rubber cushioning unit and follower plate assembled with said follower, said spacing members, when removed, permitting the rubber unit to expand and press said follower plate against the rear end of the casing.

5. In a mechanism of the character described, the combination with a casing closed at one end and having vertically extending, transverse stop shoulders adjacent the rear end portion thereof, said shoulders being on opposite sides of said casing; of a follower member having forwardly extending arms at opposite sides thereof provided with inturned flanges at their outer ends, said flanges being engageable in front of said stop shoulders of the casing; a follower plate between the arms of said follower member; a rubber cushioning unit between said arms and bearing at opposite ends on said follower plate and said follower member, respectively, said follower plate being of greater width than said casing; spacing keys interposed between said flanges and the forward side of said follower plate, said keys exceeding in thickness, in a direction lengthwise of the mechanism, the distance between said stop shoulders and the end of the casing, whereby clearance is provided, between the follower plate and the inner sides of the inturned flanges of the side arms of the follower member, which is greater than the distance between the rear end of the casing and the stop shoulders thereof, said follower plate being of a width to laterally project beyond the opposite sides of the casing to provide portions clear of the casing for engagement by said keys, and said arms being spaced from the sides of the casing to accommodate said keys, said rubber unit returning to its expanded state when said keys are absent, thereby forcibly pressing said follower plate against said casing.

VERNON S. DANIELSON.
CARL A. ANDERSON.

References Cited in the file of this patent

UNITED STATES PATENTS

| Number | Name | Date |
|---|---|---|
| 2,141,680 | Barrows | Dec. 27, 1938 |
| 2,458,572 | Dentler | Jan. 11, 1949 |